United States Patent
Ambrosio et al.

(10) Patent No.: US 7,323,272 B2
(45) Date of Patent: Jan. 29, 2008

(54) BATTERY ENCLOSURE FOR ELECTRIC AND HYBRID ELECTRIC VEHICLES OPTIMIZED FOR AIR-COOLING

(75) Inventors: Joseph Mario Ambrosio, Smithtown, NY (US); Konstantinos Sfakianos, Astoria, NY (US)

(73) Assignee: Odyne Corporation, Hauppauge, NY (US)

( * ) Notice: Subject to any disclaimer, the term of this patent is extended or adjusted under 35 U.S.C. 154(b) by 88 days.

(21) Appl. No.: 11/322,024

(22) Filed: Dec. 29, 2005

(65) Prior Publication Data

US 2006/0172187 A1 Aug. 3, 2006

Related U.S. Application Data

(60) Provisional application No. 60/639,490, filed on Dec. 29, 2004.

(51) Int. Cl.
*H01M 2/10* (2006.01)
*H01M 2/02* (2006.01)
*H01M 10/50* (2006.01)

(52) U.S. Cl. ............... 429/100; 429/99; 429/120; 429/148; 429/149; 429/159

(58) Field of Classification Search ............ 429/49, 429/99, 100, 120, 150, 156, 159, 179
See application file for complete search history.

(56) References Cited

U.S. PATENT DOCUMENTS

| | | | |
|---|---|---|---|
| 5,366,827 A * | 11/1994 | Belanger et al. | 429/99 |
| 5,620,057 A | 4/1997 | Klemen et al. | 180/68.5 |
| 6,395,417 B1 * | 5/2002 | Frazier | 429/49 |
| 6,524,743 B2 * | 2/2003 | Vackar | 429/159 |
| 2002/0028376 A1 * | 3/2002 | Yamane et al. | 429/120 |
| 2005/0202315 A1 * | 9/2005 | Sugeno et al. | 429/156 |
| 2005/0271934 A1 * | 12/2005 | Kiger et al. | 429/159 |

\* cited by examiner

*Primary Examiner*—Alexa Neckel
*Assistant Examiner*—Fatou G Maiga
(74) *Attorney, Agent, or Firm*—Alfred M. Walker

(57) ABSTRACT

An air-cooled battery enclosure includes a battery tray frame having a floor section including a plurality of outer slats joined to a lower floor frame. A plurality of corner posts extend upward from the lower floor frame. An array of a plurality of criss-crossed inner slats are joined to the outer slats. Outer side walls join the posts, the outer slats and a set of inner slats in a criss-crossed array of cubbyhole compartments. Each cubby hole compartment contains a battery. A plurality of air spaces are located between respective adjacent walls of the enclosure frame for circulation of cooling gas, such as air. In an alternate embodiment stackable battery trays have outer walls with corrugations to space batteries within the tray from outer walls and an open mesh floor. Criss-crossed internal spring baffles with shallow bends within the trays form spaces for the circulation of cooling gas.

10 Claims, 3 Drawing Sheets

BATTERY ENCLOSURE FOR ELECTRIC AND HYBRID ELECTRIC VEHICLES OPTIMIZED FOR AIR-COOLING

CROSS REFERENCE TO RELATED APPLICATIONS

This application claims the benefit, Under 35 U.S.C. 119(e) of U.S. Provisional Application No. 60/639,490, filed Dec. 29, 2004, which is hereby incorporated by reference.

FIELD OF THE INVENTION

The present invention relates to battery enclosures for electric and hybrid electric vehicles, wherein the battery enclosures are optimized for air-cooling.

BACKGROUND OF THE INVENTION

The present invention is directed to electric and hybrid electric off-road and on-road vehicles, which use solely a battery pack or a battery and electric generator combination to supply energy for propulsion. The invention addresses a variety of environmental challenges associated with reliable and long-term battery operation. Vehicles utilizing the said invention include electric and hybrid electric buses, trucks, material handling vehicles (forklifts and pallet jacks), neighborhood electric vehicles, and airport support equipment.

OBJECTS OF THE INVENTION

The object of the invention is a battery tray enclosure, which is optimized for air-cooling and the reduction of mass. Typical methods for battery enclosure design (also called battery trays) result in battery enclosures which are closed on all sides and do not allow for the passage of air. During charging or driving the batteries heat up causing warping of the battery plates leading to premature failure.

Typical battery enclosures are designed for manufacturing ease and are not optimized for battery long-term operation. The invention promotes longer battery life by providing the ability for air movement. Air movement can be achieved in two ways: by natural convection or an electro-mechanical air circulator (such as a fan or blower).

Another object of the invention is the reduction of mass, resulting in a lighter and less expensive tray along with improved vehicle range and/or performance.

Still another object of the invention is that the battery cells are individually immobilized within the tray allowing for easier installation and removal. Each battery cell has its own location within the tray, which allows air-circulation on all sides while securing the battery. Typical methods of battery tray design require that the batteries be forced together through the force exerted by the outer tray walls and by each cell. The invention provides an individual "slot" for each battery allowing for simplified access.

Other objects which become apparent from the following description of the present invention.

SUMMARY OF THE INVENTION

In keeping with these objects and others which may become apparent, to reduce mass and enhance the air flow around batteries or cells in an enclosure, the present invention is a battery tray enclosure itself, which is an open structure with corner posts and a bottom frame which is made of spaced-apart slats. Typically, the material is steel or aluminum, and welding is the preferred method for attaching the individual parts. The sides of the enclosure are also made of spaced apart slats which leave much area for natural convection around the periphery. Internal slats attached to the side slats in an orthogonal fashion, but spaced vertically apart depending on direction, form rectangular pockets (as seen from above) sized to locate individual cells or batteries adjacent to each other, but leaving spaces between for air circulation. An optional air circulator in the form of a fan with a cowl can be attached to any of the sides of the enclosure to provide forced convection cooling.

An alternate embodiment for lower profile batteries or cells is designed to reinforce vertical air circulation around and between batteries or cells whether through natural convection or forced convection. Two or more sections of the alternate embodiment can be stacked for natural convection cooling. This enclosure is designed as a tray with solid sheet metal walls with corrugation features to position the batteries or cells a small distance away thereby leaving an air space. The bottom is open mesh and is elevated a small distance away from a supporting floor by corner feet to form an air intake space to admit cooling air under the mesh floor. Inside are low orthogonal barriers with shallow bends in the walls to grasp the sides of the batteries or cells and keep them spaced apart from each other; these are preferably of a material with a spring temper. For forced convection, a form-fitting sealed air plenum is placed underneath the enclosure sealing the enclosure sides to the plenum. The top surface of the plenum has exit holes positioned under the center of each battery or cell in the enclosure acting as impingement nozzles when the plenum is pressurized by the attached squirrel cage blower. For a stacked configuration, these optional plenums for forced convection can be interspersed between stacked sections.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE DRAWINGS

Figure 1:
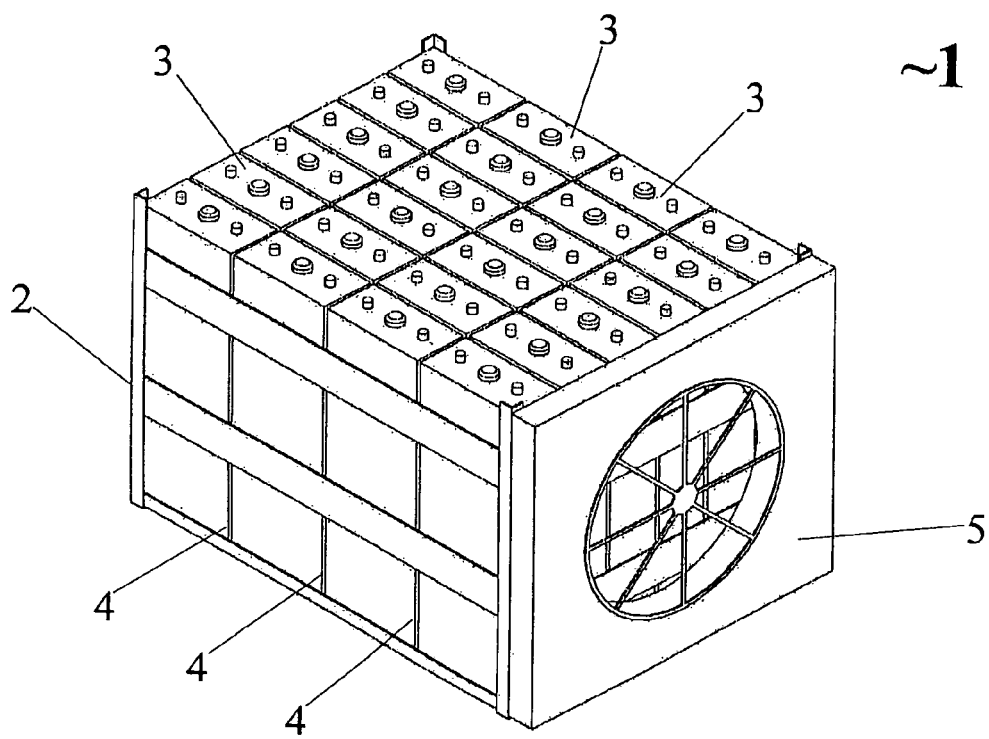
FIG. 1 is a perspective view of the enclosure of this invention with battery cells installed and an optional air circulator.

Enclosure 1 of this invention is shown in FIG. 1 housing batteries or cells 3 in frame 2 with optional air circulator 5 at one end. Circulator 5 is a fan unit in a form-filling cowl. Note the air spaces 4 between adjacent batteries or cells.

Figure 2:
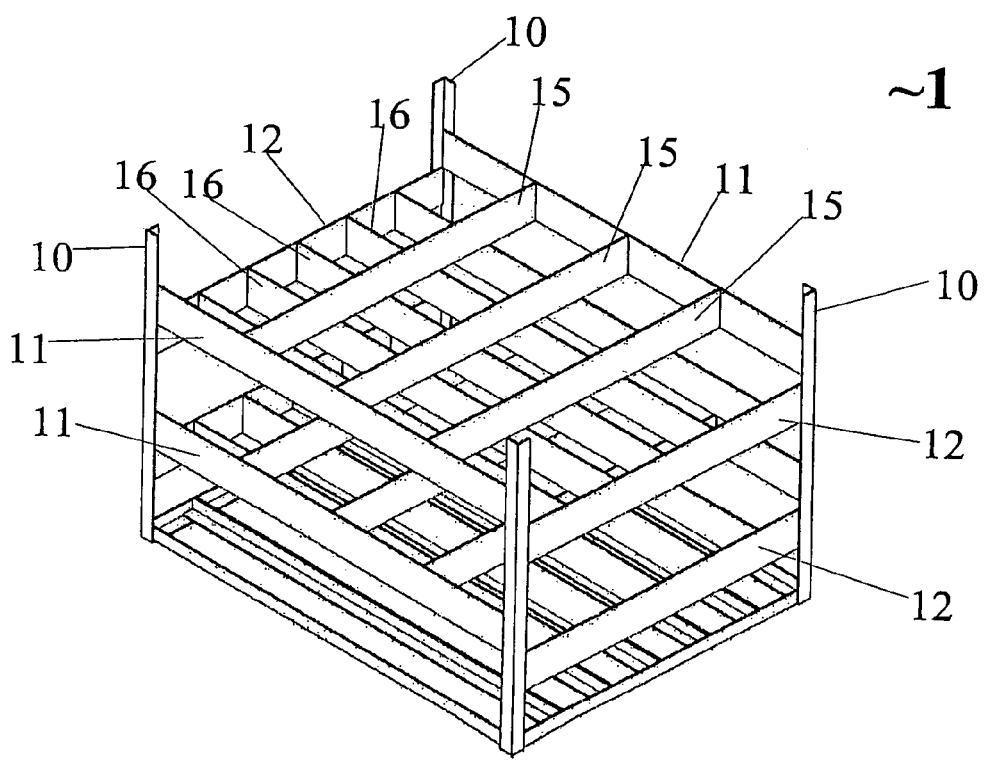
FIG. 2 is a perspective view of the enclosure showing the open construction to enhance convective air flow.

The construction of battery tray frame 2 is evident in FIG. 2. Although not clearly visible in this illustration, the floor section is made of slats joined to a lower rectangular floor frame; corner posts 10 emerge from this floor frame. Outer side slats 11, in one direction, are welded or otherwise joined to posts 10; orthogonal side slats 12 are also joined to posts 10. On the inside are longitudinal slats 16 and cross slats 15 which cross each other at different levels; these form rectangular "cubby holes" to locate each cell or battery.

Figure 3:
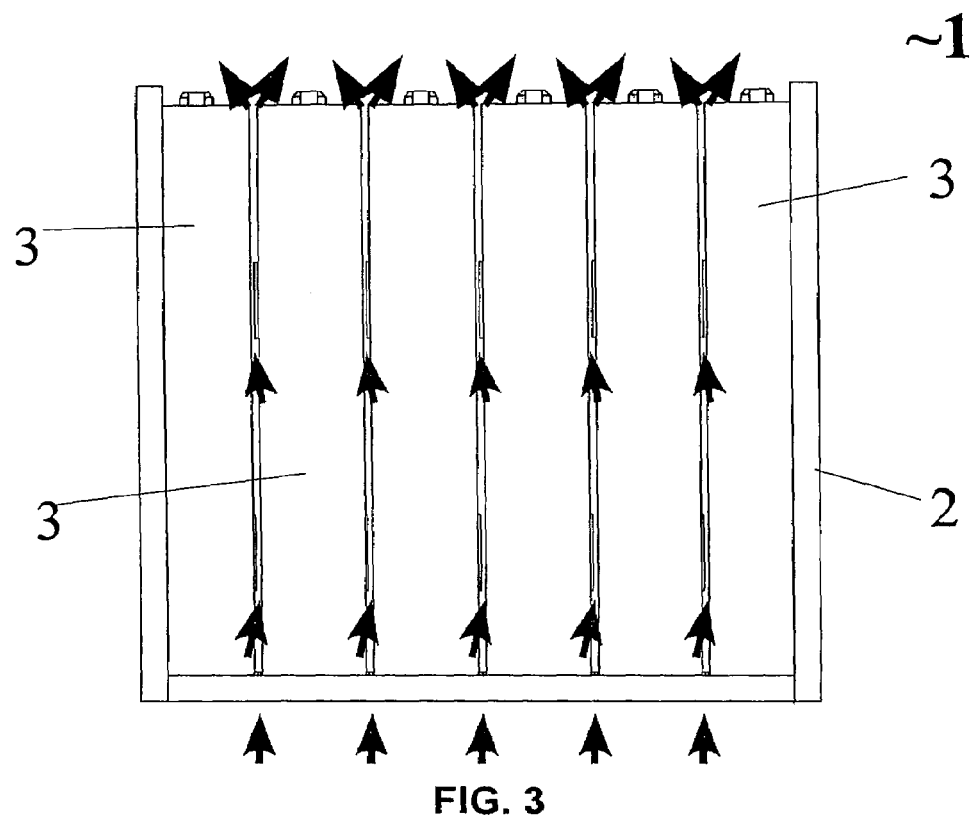
FIG. 3 is an end view illustration showing the vertical component of air flow between adjacent batteries or cells within the battery tray enclosure.

The vertical component of air flow is shown in FIG. 3 between the adjacent walls of batteries or cells 3 within enclosure frame 2.

Figure 4:
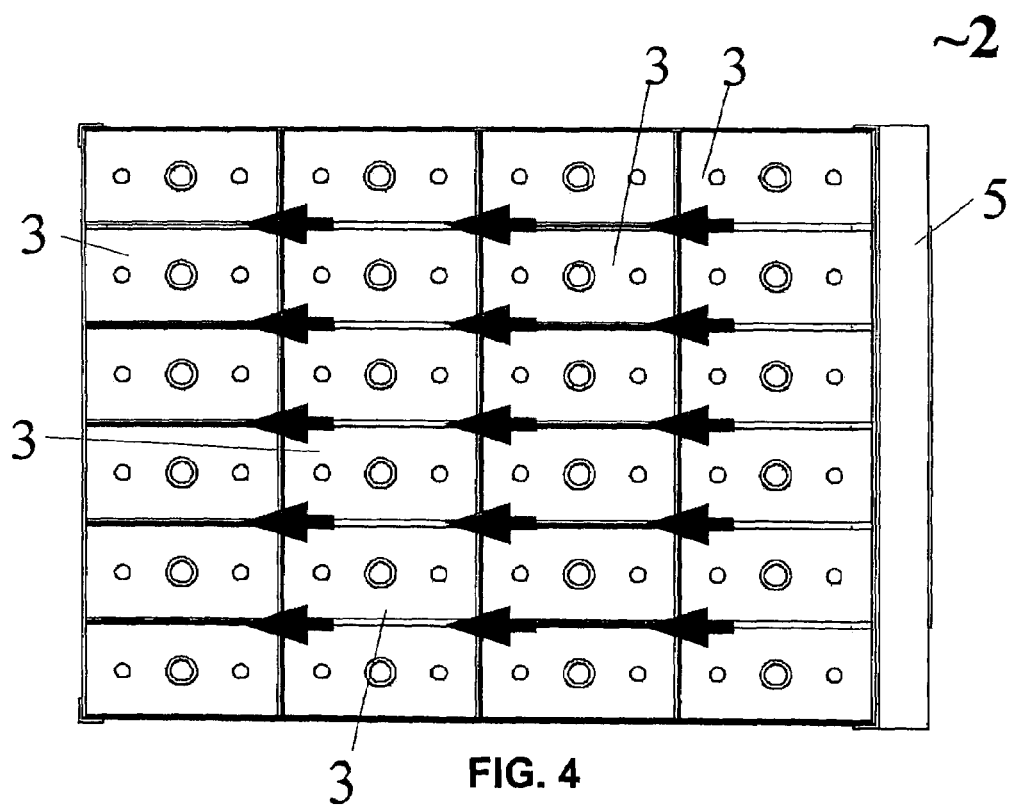
FIG. 4 is a top view of the battery tray enclosure with attached circulator illustrating the air flow between adjacent batteries or cells.

FIG. 4 shows the top view of battery tray enclosure 1 with the matrix of spaced apart batteries or cells 3. The air flow laterally forced by circulator 5 is illustrated by the black arrows between adjacent cells or batteries.

Figure 5:
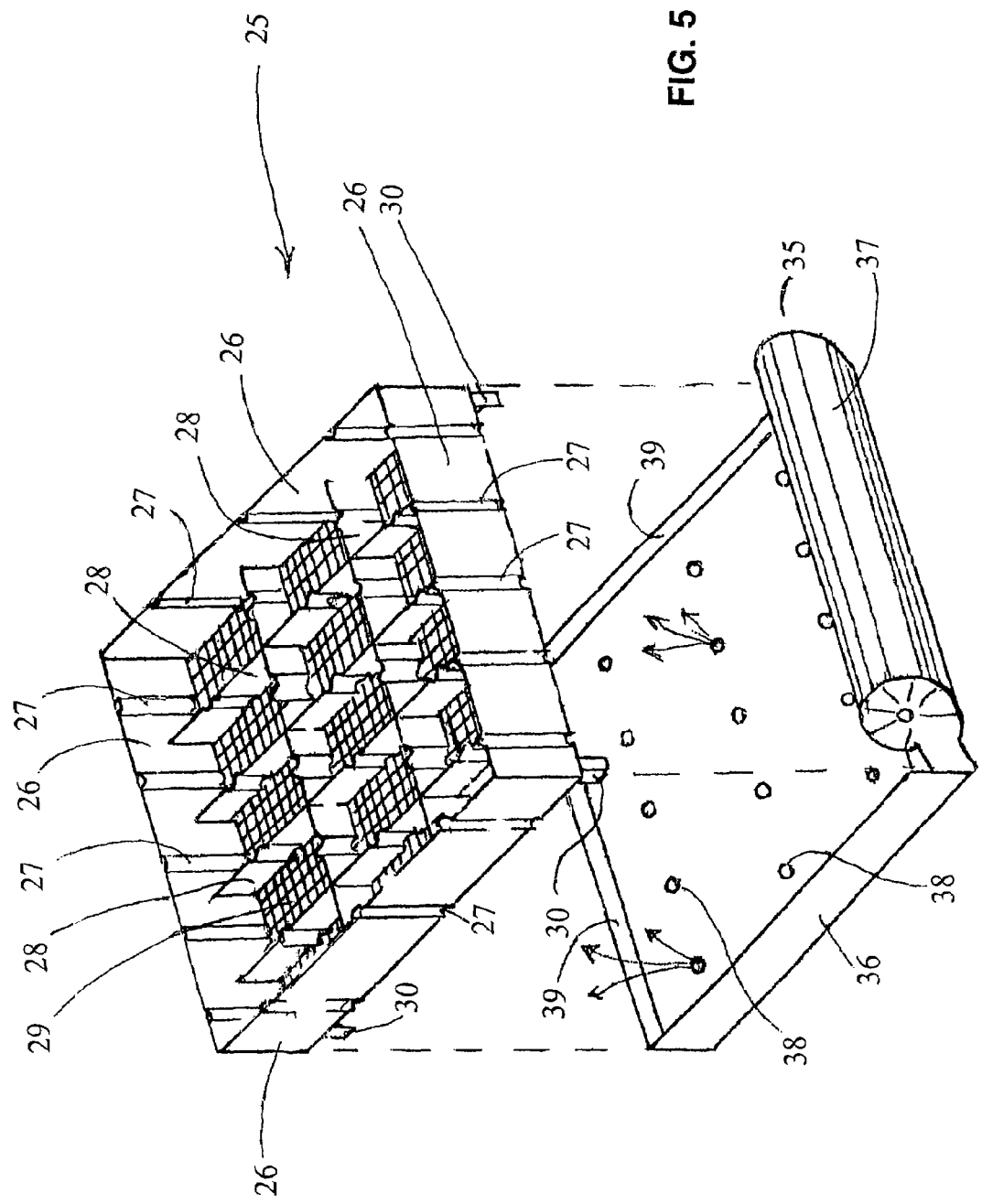
FIG. 5 is a perspective view of a battery tray enclosure of an alternate embodiment of this invention with an optional forced convection unit.

Alternate embodiment battery tray 25 is shown in FIG. 5. The illustration shows an unpopulated tray 25 which would accommodate 15 rectangular batteries of lower profile than batteries 3 of the first embodiment. Solid walls of sheet metal 26 with vertical locator corrugations 27 to keep batteries located away (for air flow) form the perimeter. Corner feet 30 keep open mesh floor 29 raised from a supporting floor to permit air entry underneath. Internal spring baffles 28 with shallow bends grasp battery sides and keep them located spaced apart to permit air flow between. Trays 25 can be stacked; feet 30 would then create an air space under the floor of an upper tray from the tops of the batteries below. This permits additional air to enter to help cool the upper trays by natural convection. Note that this alternate embodiment is designed to optimize vertical air flow between batteries and between batteries and walls 26. For forced air convection with the alternate embodiment, unit 35 is used. It has a small diameter squirrel cage blower 37 which pressurizes closed air plenum 36 with exit holes 38 positioned under the center of each battery location when plenum 36 is placed underneath battery tray enclosure 25. Note that extended wall lip 39 on plenum 36 seals the bottom edge opening around walls 26 that is formed by feet 30. Thus, when used, forced convection unit 35 uses direct impingement cooling of the bottom surface of each battery as exit holes 38 become efficient directed air nozzles. The air then flows around the sides and between adjacent batteries in an efficient vertical pattern. The air flow pattern is closely matched from battery to battery regardless of location. Note that convection units 35 can be interspersed between each pair of battery tray enclosures 25 in a stacked configuration of two or more units.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. An air-cooled battery enclosure for and in combination with a plurality of batteries comprising:
    a rectangular floor section made up of a plurality of spaced, parallel slats bounded by a lower rectangular floor frame;
    a vertically extending corner post extending up from each corner of said rectangular floor section forming the corners of first, second, third and fourth outer sides of said enclosure;
    oppositely facing first and third outer sides of said enclosure made up of a first plurality of spaced slats with vertically extending flat surfaces extending from adjacent corner posts, the slats on oppositely facing first and third sides of said enclosure facing each other;
    oppositely facing second and fourth outer sides of said enclosure made up of a second plurality of spaced slats with vertically extending flat surfaces extending from adjacent corner posts, the slats on oppositely facing second and fourth sides of said enclosure facing each other, said first and second plurality of spaced slats being staggered from each other;
    a third plurality of spaced slats with vertically extending flat surfaces joining oppositely facing first plurality of spaced slats; and
    a fourth plurality of spaced slats with vertically extending flat surfaces joining oppositely facing second plurality of spaced slats, said fourth plurality of spaced slats located between and alternating between said third plurality of spaced slats forming alternating criss-crossing of said third and fourth plurality of spaced slats, the criss-crossing of staggered third and fourth plurality of spaced slats bounded by said slats in said outer sides of said enclosure forming cubby hole compartments for individual batteries with air spaces between said individual batteries for circulation of cooling gas in both horizontal and vertical directions.

2. The air-cooled battery enclosure of claim 1 in which said corner posts are L-shaped for accommodating adjacent slats.

3. The air-cooled battery enclosure of claim 2 in which said corner posts and slats are constructed of metal.

4. The air-cooled battery enclosure of claim 3 in which all attachments of slats to said corner posts and to each are other are welds.

5. The air-cooled battery enclosure of claim 1 having a forced air circulator mounted adjacent one side of said enclosure for circulating air through said enclosure.

6. An air-cooled battery enclosure for and in combination with a plurality of batteries comprising:
    a battery tray frame having a floor section including a plurality of spaced floor slats joined to a lower floor frame;
    a plurality of corner posts extending upward from said lower floor frame;
    a plurality of criss-crossed inner slats joined to outer slats extending between adjacent corner posts forming sides of said enclosure, said outer slats being spaced from each other, said criss-crossed slats being spaced from each other, and said slats on each side of said enclosure being spaced from slats in adjacent sides of said enclosure;
    said criss-crossed inner slats forming an array of cubbyhole compartments; each cubby hole compartment containing a battery therein; and,
    a plurality of air spaces between respective adjacent sides of said enclosure for circulation of cooling gas in both horizontal and vertical directions.

7. The air-cooled battery enclosure of claim 6 in which said corner posts are L-shaped for accommodating adjacent slats.

8. The air-cooled battery enclosure of claim 7 in which said corner posts and slats are constructed of metal.

9. The air-cooled battery enclosure of claim 8 in which all attachments of slats to said corner posts and to each are other are welds.

10. The air-cooled battery enclosure of claim 6 having a forced air circulator mounted adjacent one side of said enclosure.

* * * * *